United States Patent [19]

Florentine

[11] 3,743,258

[45] July 3, 1973

[54] FUEL CONVERTER

[76] Inventor: Frederick W. Florentine, 332 Wayne Terrace Union, N.J. 07083

[22] Filed: Nov. 3, 1971

[21] Appl. No.: 195,286

[52] U.S. Cl.............. 261/142, 261/79 R, 261/95, 261/23 A, 261/50 R, 261/69 R, 123/122 F, 123/135
[51] Int. Cl............................................. F02m 15/04
[58] Field of Search.................... 123/122 F, 122 R, 123/135; 261/142, 144, 145, 50 R, 95, 79 R, 23 A, 69 R

[56] References Cited
UNITED STATES PATENTS

| | | | |
|---|---|---|---|
| 544,879 | 8/1895 | Best | 123/135 |
| 1,148,247 | 7/1915 | Moore | 261/142 |
| 1,503,900 | 8/1924 | Johnson | 123/122 F |
| 1,637,104 | 7/1927 | Crone | 123/122 F |
| 1,791,949 | 2/1931 | Boulade | 123/122 F |
| 1,903,433 | 4/1933 | Bjering | 261/145 |
| 3,107,660 | 10/1963 | Terao | 123/122 R |
| 3,352,545 | 11/1967 | Denine | 261/DIG. 38 |
| 3,395,899 | 8/1968 | Kopa | 261/79 R |
| 3,583,377 | 6/1971 | Graziano | 123/141 |
| 3,625,190 | 12/1971 | Boissevain | 123/122 F |

FOREIGN PATENTS OR APPLICATIONS

| | | | |
|---|---|---|---|
| 154,499 | 12/1920 | Great Britain | 261/142 |
| 28,820 | 4/1925 | France | 123/122 F |
| 380,870 | 1/1940 | Italy | 261/142 |

*Primary Examiner*—Tim R. Miles
*Attorney*—Hanse H. Hamilton

[57] ABSTRACT

A converter for supplying a combustible mixture of air and a gaseous fuel to an internal combustion engine. The converter replaces a conventional carburetor and its purpose is to effect burning of the fuel mixture more efficiently and completely.

The converter comprises a venturi device having an inlet connected to an air filter and an outlet connected to an intake manifold of an internal combustion engine. A throttle plate located between the venturi device and the filter contains a main throttle valve which controls the supply of air to the venturi device and a second throttle valve which controls the supply of a mixture of gaseous fuel and air to the venturi device.

For idle and low speed operation, the mixture of gaseous fuel and air is admitted through the second throttle valve. For increased speed and power, air is admitted through the main throttle valve and at the same time liquid fuel is supplied to a roughened and heated interior surface of a center of the venturi device. A film of the liquid fuel spreads over the roughened interior surface of the venturi center and is evaporated quickly into gas which mixes with the air.

The amount of liquid fuel supplied to the roughened interior surface of the venturi center is controlled by a needle valve which is set by a monitoring device. The monitoring device is connected across the venturi device and senses the pressure differential in the venturi device for setting of the needle valve.

Thus, air and a mixture of air and gaseous fuel is admitted to the venturi device through the primary or main throttle valve and the secondary throttle valve in the throttle plate for operation of the engine.

When the film of the liquid fuel spreads over the roughened surface of the venturi center, it is quickly converted to a gas and the gas is combined and thoroughly mixed with warm turbulent air drawn into the inlet of the venturi device through the main throttle valves by operation of the engine. This supplements the mixture of gaseous fuel and air admitted through the secondary throttle valves.

The amount of the film of liquid fuel supplied to the venturi center is controlled by the monitoring device in conjunction with the amount of warm turbulent air entering the venturi inlet through the main throttle valves so that the proper mixture of gas and air is obtained in accordance with the power required by the engine.

10 Claims, 7 Drawing Figures

United States Patent [19]
Florentine
[11] 3,743,258
[45] July 3, 1973
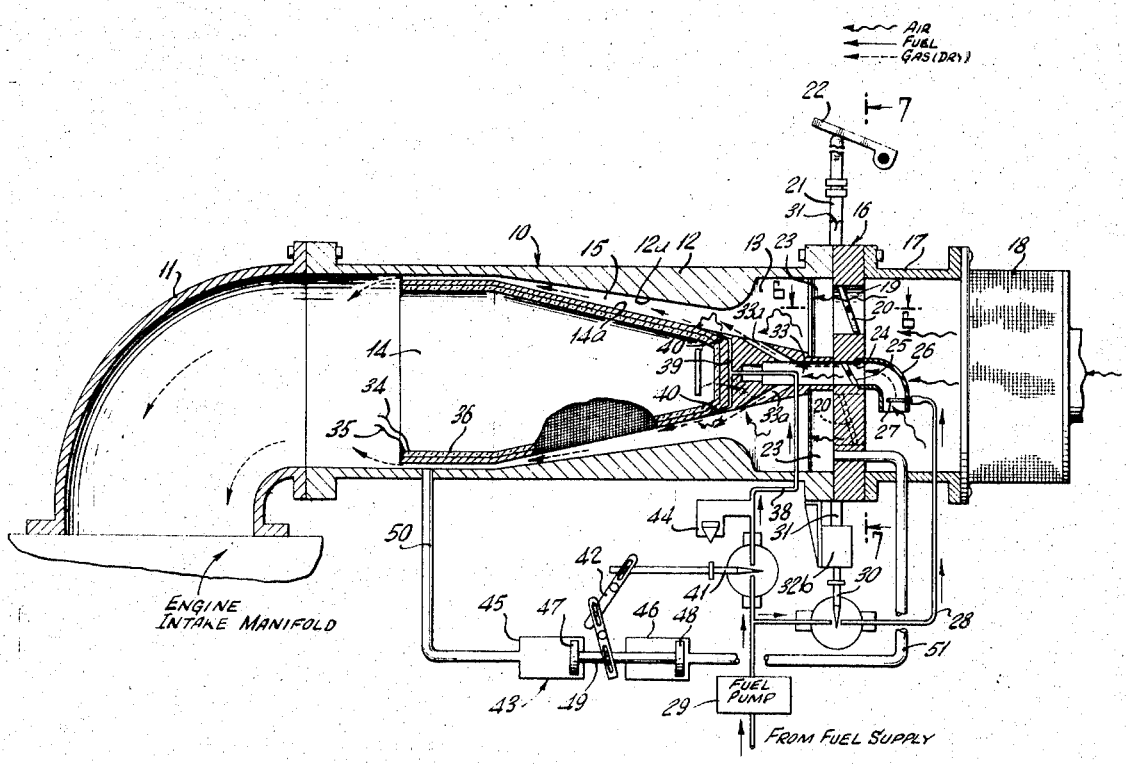

Patented July 3, 1973

INVENTOR
FREDERICK W. FLORENTINE

Hanse H. Hamilton
ATTORNEY

Patented July 3, 1973
3,743,258
3 Sheets-Sheet 2
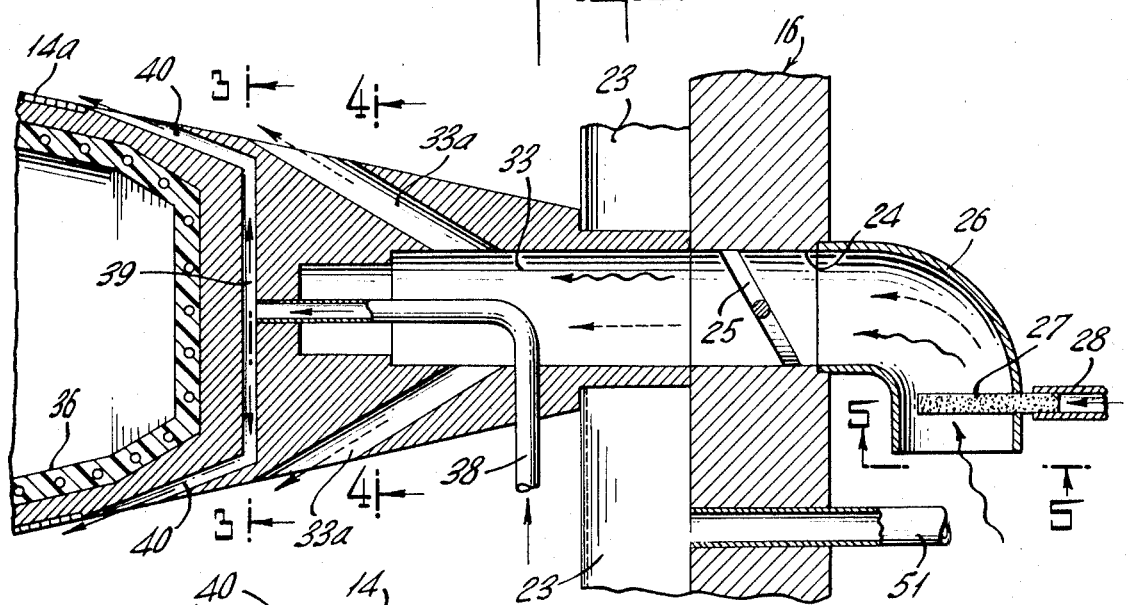
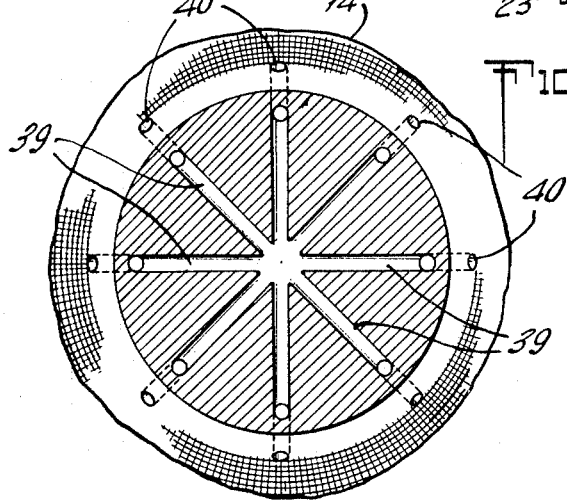
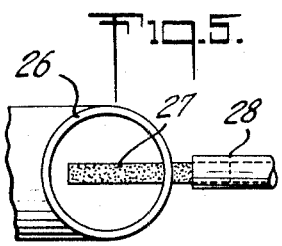
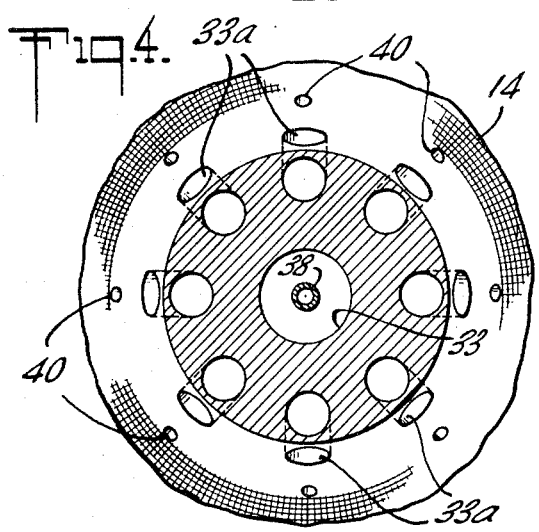
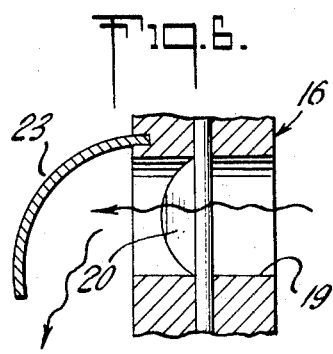
INVENTOR
FREDERICK W. FLORENTINE
BY Hanse H. Hamilton
ATTORNEY Patented July 3, 1973 3,743,258

INVENTOR
FREDERICK W. FLORENTINE
BY
Hanse H. Hamilton
ATTORNEY

FUEL CONVERTER

The present invention relates to a converter for supplying a combustible mixture of gaseous fuel and air to an internal combustion engine. It also relates to a system for supplying a combustible mixture of gaseous fuel and air to the engine as required.

The converter of the present invention replaces a conventional carburetor and an object of the invention is to supply a mixture of gaseous fuel and air which burns more efficiently and completely. The converter may be employed in engines of various types including automotive and aircraft engines using evaporable fuels such as gasoline, kerosene, alcohol or diesel fuel.

Due to more complete and efficient burning of the mixture, the converter reduces contamination in engine exhaust which causes pollution of the atmosphere.

Another object of the invention is to provide a converter for supplying a mixture of gaseous fuel and air to an internal combustion engine in which the fuel mixture does not pass through an air filter so that burning of the mixture and contamination of the air will not be affected by operation of the filter.

For a better understanding of the invention, the operation of the subject converter will be described briefly. An evaporable liquid fuel such as gasoline or the like is supplied from a fuel pump or other suitable supply of liquid fuel to an inlet of a venturi device having an outlet connected to an intake manifold of an engine. The venturi device includes a center having a roughened and heated interior surface which defines one side of a venturi passageway. A thin film of the liquid fuel spreads over the roughened and heated interior surface of the venturi center which quickly converts the film of liquid fuel to gas. The gas arising from this surface is thoroughly mixed with warm turbulent air drawn into the venturi inlet. The outlet of the venturi is connected to the intake manifold of the engine so that the combustion mixture will be drawn through the venturi device by operation of the engine. Roughening of the heated interior surface of the venturi center promotes the spreading of the film of liquid fuel over this surface and the spreading is also aided by the flow of the mixture through the venturi.

The amount of gaseous fuel supplied to the engine is controlled (1) by regulating the thickness of the film of liquid fuel supplied to the venturi center, (2) by regulating the temperature of the roughened interior surface of the venturi center and (3) by regulating the quantity of warm turbulent air which is admitted to the venturi device. In this connection, it has been found that complete evaporation of the film of liquid fuel to gas can be achieved in a short time and that the gas from the fuel can be mixed with the warm turbulent air while avoiding an excessively hot induction mixture and the chance of fire or preignition.

The air entering the venturi inlet may be heated by passing the air over an exhaust manifold of the engine or the like with the temperature of air being controlled thermostatically so as to maintain a temperature of the entering air in the neighborhood of 135° F.

For idle and low power operation of the engine, a portion of the air entering the converter is directed over an exposed surface of a porous body supplied with liquid fuel. The exposed surface of the porous body supports a film of liquid fuel which is disposed in the path of the diverted entering air. The film of liquid fuel on the exposed surface evaporates as a gas which is picked up by the air drawn into the engine. The porous body may be made of sintered metal or the like and is connected to the fuel pump or other fuel supply through a first needle valve which controls the amount of liquid fuel supplied to the porous body.

The first or low-speed needle valve is connected through a suitable mechanical linkage and gears to a main throttle valve or valves which control the flow of warm air to the venturi inlet and operate in conjunction therewith.

When the engine speed or power increases, the main throttle valve or valves open to admit the additional warm air as required to the venturi inlet. As the amount of warm air entering the venturi inlet increases, the amount of liquid fuel supplied from the low-speed needle valve also increases. Thus, a richer low-speed mixture is provided and is completely combined with and thoroughly mixed with the warm turbulent air as the mixture is drawn into the engine.

As increased power is required, the main throttle valves open further and allow more warm air to enter the inlet of the venturi body. As the amount of warm air entering the venturi inlet increases, the amount of liquid fuel supplied to the heated and roughened surface of the venturi center is increased by means of a second needle valve connected to the fuel pump or other fuel supply. Adjustment of the second needle valve is automatically set or controlled by the monitoring device in accordance with the power required. The monitoring device senses the pressure differential across the venturi and is connected to the second needle valve to set the needle valve accordingly.

Turbulence is imparted to the warm air admitted by the main throttle valves by vanes in the venturi inlet. The turbulence of the air causes the air to become thoroughly mixed with the gas arising from the rough heated surface of the venturi center to form the combustion mixture. Both mixtures of air and gas are drawn through the venturi passageway and into the intake manifold of the engine by suction created in operation of the engine.

Further objects and advantages of the invention will be better understood from the following description and the accompanying drawings, in which:

FIG. 2 is a fragmentary view in vertical section of part of the fuel converter shown in FIG. 1, but is drawn to an enlarged scale;

FIG. 3 is a section view taken along the line 3—3 of FIG. 2;

FIG. 4 is a section taken along line 4—4 of FIG. 2;

FIG. 5 is a section view taken along line 5—5 of FIG. 2;

FIG. 6 is a section view taken along line 6—6 of FIG. 1, but is drawn to an enlarged scale.

Figure 1:
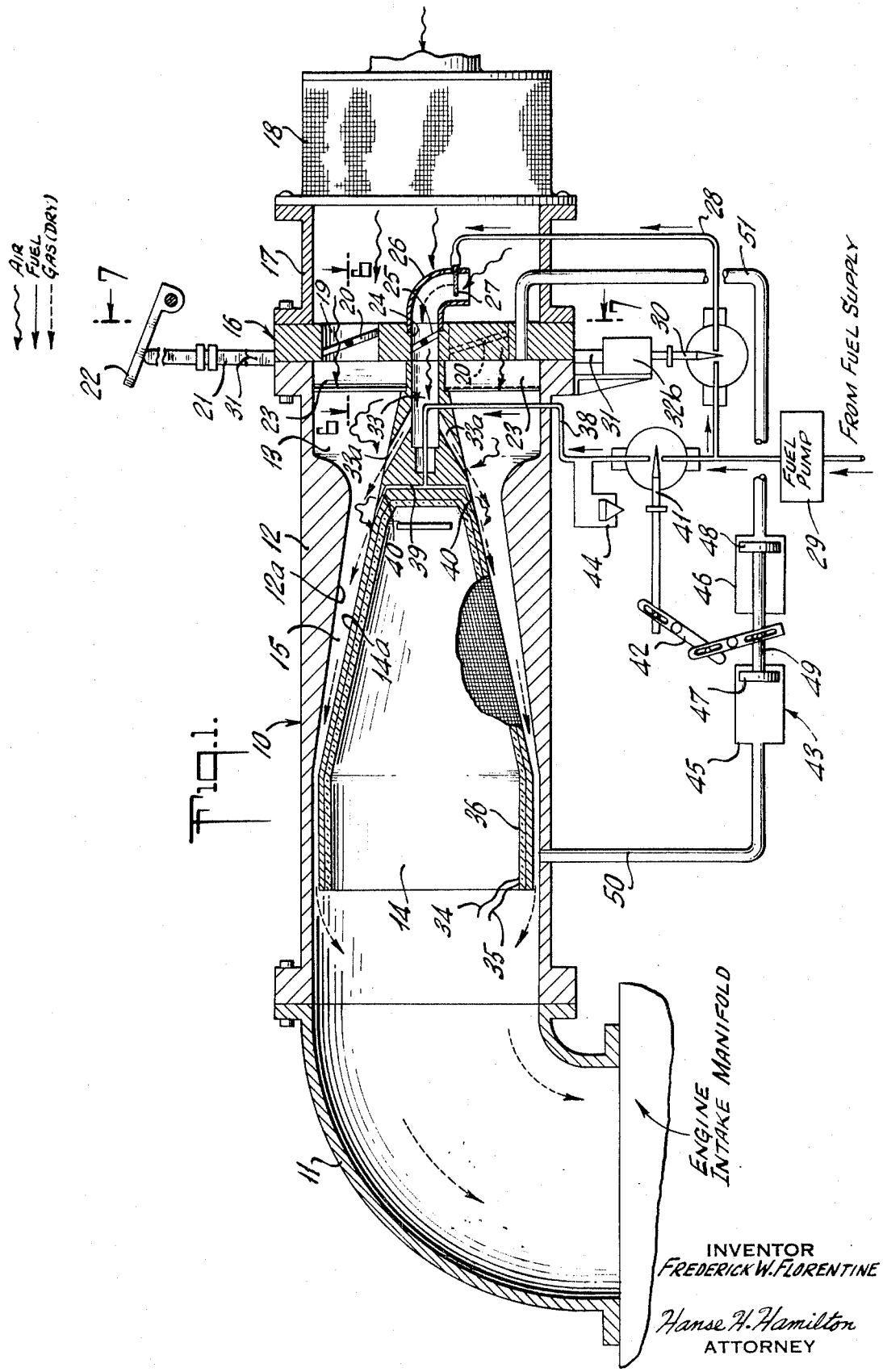
FIG. 1 is a side view in vertical section schematically illustrating a fuel converter embodying the invention connected to an intake manifold of an internal combustion engine.

Referring to the drawings in detail, FIG. 1 schematically illustrates a system for supplying a combustible mixture of gaseous fuel and air to a conventional internal combustion engine (not shown).

As shown in the drawings, the system includes a venturi device 10 having an outlet and an inlet. The outlet of the venturi is connected to an intake manifold 11 of the engine and a mixture of gas and air is drawn through the venturi device 10 by operation of the engine.

The venturi device 10 comprises an outer body 12 having a bell shaped throat or inlet forming an intake chamber 13 and an inner or center member 14. The outer body 12 and the venturi center 14 have opposing surfaces 12a and 14a which define a verturi passageway 15 extending rearwardly from the intake chamber 13.

A throttle plate 16 is connected to the outer body 12 of the venturi device 10 at the inlet thereof. The throttle plate is connected through an intake pipe 17 to an air filter 18 which communicates with a suitable source of warm air.

Figure 7:
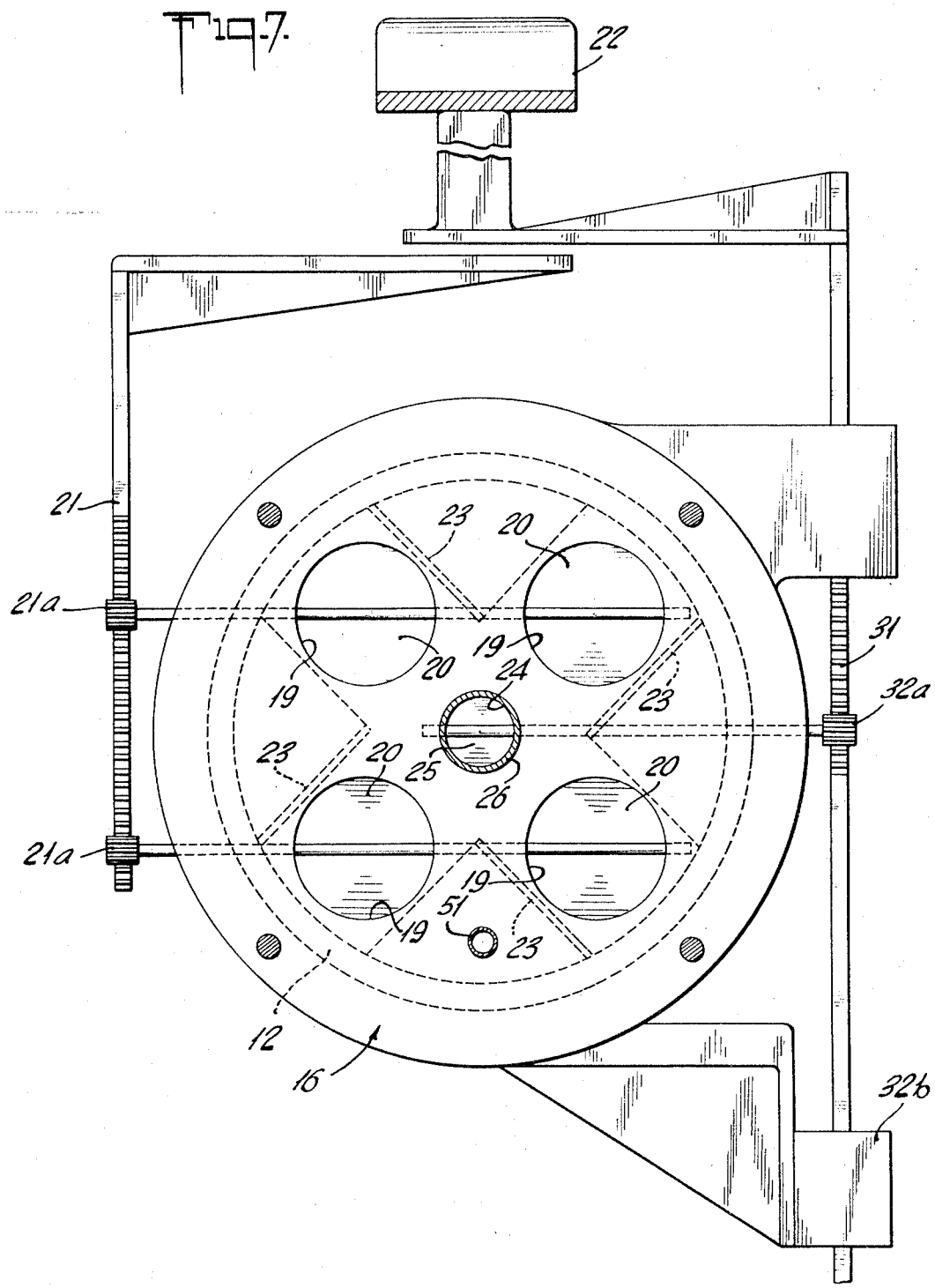
FIG. 7 is a section view taken along line 7—7 of FIG. 1, but is drawn to an enlarged scale.

As shown best in FIGS. 1 and 7, the throttle plate 16 contains one or more passageways 19 which extend through the throttle plate 16. The passageways 19 contain butterfly valves 20 which control the flow of the warm air through the passageways 19 in the plate 16 to the inlet of the venturi device 10. The butterfly valves 20 are opened or closed by means of a linkage 21 and gears 21a or other suitable mechanism which may be operated by the usal accelerator pedal 22.

Turbulence is imparted to warm air as it enters the venturi inlet through the passageways 19 by means of curved blades or vanes 23. The vanes 23 are supported in fixed positions on the forward end of the venturi center 14 immediately behind the passageways 19. Preferably, the air entering the venturi inlet is heated to a temperature in the neighborhood of 135° F. which may be done by passing the air entering the air filter 18 over the exhaust manifold (not shown) of the engine or in other suitable manner.

A passageway 24 is provided at the center of the throttle plate 16 and contains a butterfly valve 25 through which a mixture of gas and air is admitted to the inlet of the venturi device 10 for idle and low-power operation of the engine. For this purpose, a portion of the warm air from the filter 18 is directed through a pipe 26 to the passageway 24.

The warm air flowing through the pipe 26 passes over a porous body 27. The porous body 27 is supplied with liquid fuel by a line 28 which is connected to a fuel pump 29 through a first needle valve 30. The first needle valve 30 regulates the flow of the liquid fuel to the porous body 27 and operation of the butterfly valve 25 and the needle valve 30 is controlled by a linkage 31 and gears 32a and 32b which are also operated by the pedal 22. The linkage 31 and gears 32a and 32b are arranged to open the butterfly valve 25 and the needle valve 30 in advance of opening of the main throttle valves 20 in the throttle plate 16.

A film of liquid fuel forms on the surface of the porous body 27 and the liquid fuel evaporates from this surface as a gas which mixes with the air passing through the pipe 26 and into the passageway 24. From the passageway 24, the mixture enters a passageway 33 in the nose or front end of the venturi center 14 and the mixture is discharged through a series of rearwardly inclined radially spaced passageways 33a to the entrance to the venturi passageway 15.

The porous body 27 may be formed of a sintered metal which will retain the liquid fuel and form the film of fuel on its surface. The film of liquid evaporates as a gas and thus, mixes with the warm air passing over the body 27. This supplies a mixture of gas and air for operation of the engine for idle and low speed operations.

The venturi passageway 15 formed by opposing surfaces 12a and 14a of the outer body 12 and the venturi center 14 tapers inwardly or narrows toward the outlet of the venturi device 10.

The inner or interior surface 14a of the venturi center 14 is roughened to promote the speading of the film of liquid fuel over this surface and is also heated to evaporate the film of liquid into a gas quickly as the film of liquid fuel spreads over this surface in operation of the converter. The heating of the interior surface 14a may be done electrically from a battery (not shown) which is connected through wires 34, 35 to a resistance element or coating 36 applied to the interior of the venturi center 14. Only enough heat is supplied to the interior surface 14a of the venturi center 14 to evaporate the film of liquid fuel on said surface quickly. As the gas and the turbulent warm air is drawn through the venturi passageway 15, the air and gas are thoroughly mixed to form the combustion mixture. This supplements the mixture entering through the passageway 33.

The heating of the surface 14a may also be accomplished by heat exchanger tubes connected to the cooling system (not shown) of the engine or in other suitable manner if desired.

The heated interior surface 14a of the venturi center 14 is roughened by sandblasting, knurling or the like to promote the flow and the spreading of the film of liquid fuel over the interior surface 14a of the venturi center 14 as the engine operates. The roughening or the interior surface 14a also increases the surface area of the venturi center 14 to some extent. The flow of the gas-air mixture through the venturi passageway 15 also promotes the flow of the film of liquid fuel over the surface 14a.

To obtain increased speed and power when the liquid fuel is supplied to roughened interior surface 14a of the venturi center 14, the butterfly valves 20 in the throttle plate 16 are opened to permit increased air to flow into the inlet of the venturi device 10.

A fuel line 38 connected to the fuel pump 29 supplies liquid fuel under pressure to the roughened inner surface 14a of the venturi center 14. The liquid fuel enters through a cross-passageway 39 in the forward end of the venturi center 14 and is discharged through a second series of radially spaced passageways 40. The passageways 40 as shown in FIGS. 3 and 4 are rearwardly inclined and open tangentially onto the roughened interior surface 14a of the venturi center 14.

The amount of liquid fuel supplied to the roughened interior surface 14a of the venturi center 14 is controlled by a second needle valve 41 which is located in the fuel line 38. The second needle valve 41 is adjusted or set by a linkage 42 connected to a monitoring device 43. The monitoring device 43 senses a pressure differential between the inlet and outlet of the venturi device 10 and sets the second needle valve 41 accordingly. The difference in pressure depends largely on the amount of the mixture flowing through the venturi passageway 15 and this is controlled by the opening or closing of the throttle valves 20 in the throttle plate 16 in accordance with the power demands of the engine.

A check valve 44 in the fuel line 38 alleviates the effect of manifold vacuum on the fuel line 38 and prevents an overly rich mixture.

The check valve 44 in the fuel line 38 is connected in a suitable manner (not shown) to the source of warm air and is arranged to admit warm air to the fuel line 38 when the vacuum in the intake chamber 13 of the venturi 14 is equal to or greater than the pressure on the fuel from the fuel pump 29. The check valve 44 is arranged to close when the intake suction is equal to or less than the fuel pressure at the needle valve 41. Thus, when pressure in the fuel line 38 is equal to or less than atmospheric pressure, warm air enters the fuel line 38 through the check valve 44 and when pressure in the fuel line 38 is higher than atmospheric, the check valve 44 closes.

Warm air supplied through the check valve 44 also heats the liquid fuel in the fuel line 38 and promotes evaporation of the liquid fuel as it is dispersed as a film over roughened surface 14a of the venturi center 14.

The monitoring device 43 comprises two opposing cylinders 45 and 46 which contain pistons 47 and 48, respectively. The pistons 47 and 48 are connected by a rod 49. The rod 49 is connected to the control linkage 42 for setting the second needle valve 41. The cylinders 45 and 46 are connected across the venturi 14 to sense the pressure differential between the inlet and outlet thereof. To accomplish this, the lefthand cylinder 45 is connected through a pipe 50 to the outlet of the venturi 14 and the other or right-hand cylinder 46 is connected through a pipe 51 to the inlet of the venturi 14. Thus, the pressure at the outlet of the venturi 14 will act on the piston 47 and the pressure at the inlet of the venturi 14 will act on the piston 48. A difference in pressure between the inlet and outlet of the venturi 14 causes the pistons 47 and 48 to be shifted either to the left or right. Thus, when the pressure at the outlet of the venturi device 14 increases relative to the pressure at the inlet thereof, the pistons 47 and 48 and the rod 49 are moved to the right. This movement causes the linkage 42 to set the needle valve 41 in the fuel line 38 as required.

Summary of Operation

Summarizing briefly, the subject converter is connected between the intake manifold 11 of an internal combustion engine and an air filter 18 to provide a mixture of gaseous fuel and air as required for operation of the engine. The converter comprises a venturi device 10 and a throttle plate 16. The venturi device 10 has a center 14 which forms a venturi passageway 15 in the venturi device through which the mixture of gaseous fuel and air is drawn by operation of the engine. The venturi device 10 is connected through the throttle plate 16 to the air filter 18 which communicates with a source of warm air.

For idle and low speed operation of the engine, a first throttle valve 25 controls the admission of a mixture of gaseous fuel and air to the venturi device 10. For this purpose, liquid fuel is supplied through a first fuel valve 30 to a porous body 27 and as the liquid fuel evaporates to a gas, it combines with air as the mixture is admitted through the first throttle valve 25.

For increased speed and power of the engine, the flow of air to the venturi passageway 15 is increased by opening the main throttle valves 20 and vanes 23 impart turbulence to the air as it enters the venturi passageway 15 so that the air thoroughly mixes and combines with a gaseous fuel from the venturi center 14 as the mixture passes through the venturi passageway 15.

The venturi center 14 has a roughened and heated interior surface 14a. Liquid fuel is supplied to the roughened interior surface 14a of the venturi center 14 through a second fuel valve 41 which is adjusted in accordance with the demands of the engine. A film of the liquid fuel spreads over the roughened surface 14a of the venturi center 14 and evaporates into gas. The gas mixes with the turbulent air admitted by the main throttle valves 20.

The second fuel valve 41 is adjusted in accordance with the pressure differential across the venturi device by the monitoring device 43. As the main throttle valves 20 open to admit more air to the venturi passageway, the pressure differential across the venturi device 10 increases and the second valve 41 opens to increase the thickness of the film of liquid fuel supplied to the venturi center 14.

The mixture of gaseous fuel and air entering through the first throttle valves 25 combines with the gas and the turbulent air from the main throttle valve 20 as the mixtures are drawn through the venturi passageway 15 to the engine.

The first throttle valve 25 and the main throttle valves 20 are arranged to operate in conjunction with each other by means of linkages 21, 31 and the foot pedal or accelerator 22.

It will be understood that various changes and modifications may be made by those skilled in the art in the embodiment of the invention illustrated and described herein without departing from the scope or spirit of the invention.

What I claim is:

1. A converter for supplying a combustible mixture of gaseous fuel and air to an internal combustion engine, which comprises:
    a. a venturi device for connection to an intake manifold of an engine;
    b. said venturi device having an inlet and an outlet and comprising,
    c. an outer casing and
    d. a venturi center located within said outer casing;
    e. said casing and said venturi center having opposing surfaces defining a venturi passageway having an intake communicating with said inlet and a discharge communicating with said outlet;
    f. one of said opposing surfaces comprising a roughened interior surface of the venturi center;
    g. said interior surface of the venturi center being roughened to promote the spreading of a film of liquid fuel over said surface;
    h. means for supplying liquid fuel to said roughened surface of the venturi center at the intake of said venturi passageway;
    i. said means comprising a fuel line connecting the venturi center to a supply of liquid fuel under pressure;
    j. said venturi center containing a series of radially spaced passageways connected to the fuel line and discharging onto said roughened surface at the intake of the venturi passageway; and
    k. main throttle means located at the inlet of the venturi device for controlling admission of air to said venturi device.

2. A converter for supplying a combustible mixture of gaseous fuel and air to an internal combustion engine, as defined in claim 1 which includes:

a. means for heating the roughened interior surface of the venturi center and evaporating a film of liquid fuel from said surface to a gas.

3. A converter for supplying a combustible mixture of gaseous fuel and air to an internal combustion engine, as defined in claim 2 which includes:
   a. a series of vanes mounted in the inlet of the venturi device;
   b. said vanes imparting turbulence to air entering the venturi device through said throttle means;
   c. said turbulence of the air mixing the air with fuel gas arising from said roughened interior surface of the venturi center.

4. A converter for supplying a combustible mixture of gaseous fuel and air to an internal combustion engine, as defined in claim 1 which includes:
   a. an adjustable needle valve in the fuel line supplying liquid fuel to the venturi center; and
   b. monitoring means connected across the venturi device for setting the needle valve in accordance with a pressure differential between the inlet and outlet of the venturi device.

5. A converter for supplying a combustible mixture of gaseous fuel and air to an internal combustion engine, as defined in claim 1 which includes:
   a. an adjustable needle valve in the fuel line supplying liquid fuel to the venturi center;
   b. monitoring means connected across the venturi device for setting the needle valve in accordance with a pressure differential between the inlet and outlet of the venturi device; and
   c. a check valve in said fuel line;
   d. said check valve admitting air to the fuel line when pressure in the fuel line is equal to and less than atmospheric pressure.

6. A converter for supplying a combustible mixture of gaseous fuel and air to an internal combustion engine, as defined in claim 1 which includes:
   a. a first adjustable needle valve in the fuel line supplying liquid fuel to the venturi center;
   b. monitoring means connected across the venturi device for setting said first needle valve in accordance with a pressure differential between the inlet and outlet of the venturi device; and
   c. second means for supplying a gaseous mixture of fuel and air to said intake of the venturi passageway independently of the first fuel line;
   d. said second means including a passageway communicating with a supply of air and with the intake end of the venturi passageway;
   e. a porous body positioned in the path of the air entering said passageway;
   f. a second fuel line connecting said porous body to the source of liquid fuel under pressure;
   g. a second needle valve in said second fuel line;
   h. a valve in said passageway for controlling the flow of a mixture of gas and air through said passageway;
   i. a linkage connecting said valve to said second needle valve;
   j. said linkage operating said valve and said second needle valve in conjunction with each other and prior to operation of the main throttle means.

7. A system for supplying a combustible mixture of gaseous fuel and air to an internal combustion engine, which comprises:
   a. a venturi device having an outlet adapted for connection to an intake manifold of an engine and an inlet;
   b. said venturi device having an outer casing and a venturi center;
   c. said casing and venturi center having opposing surfaces defining a venturi passageway having an intake and an outlet located within the casing;
   d. one of the opposing surfaces being formed by a roughened interior surface of the venturi center;
   e. means for heating said roughened interior surface of the venturi center;
   f. said venturi center having a first series of radially spaced passageways formed therein discharging onto the roughened interior surface of the venturi center at the intake of the venturi passageway and a second series of radially spaced passageways formed in the venturi center and discharging into the intake of the venturi passageway;
   g. an air filter connected to the inlet of the venturi device for supplying air to the venturi means;
   h. main throttle means connected between the inlet of the venturi device and the air filter for controlling the flow of air to the inlet of the venturi device;
   i. a second throttle means for controlling the flow of gaseous mixture of fuel and air to said second series of passageways;
   j. means for supplying the mixture of gaseous fuel and air to said second set of passageways during idle and low power operation of the engine;
   k. means for supplying liquid fuel to the first series of passageways in the venturi center and to the roughened interior surface thereof during high speed and high power operation of the engine;
   l. monitoring means connected across the inlet and outlet of the venturi device for sensing a pressure differential between said inlet and outlet and controlling the supply of liquid fuel to the roughened interior surface of the venturi center during high speed operation of the engine; and
   m. vane means located at the inlet of the venturi device and imparting turbulence to air entering the inlet of the venturi device.

8. A system for supplying a combustible mixture of gaseous fuel and air to an internal combustion engine which comprises:
   a. first means for supplying a mixture of a gaseous fuel and air to an internal combustion engine during idle and low speed operation of the engine;
   b. second means for increasing the amount of gaseous fuel and air mixture supplied to the engine during higher speed and power operation of the engine;
   c. said first and second means operating in conjunction with each other with said second means supplementing the mixture of gaseous fuel and air supplied to the engine by said first means;
   d. said first and second means including a venturi device having a venturi passageway therein connected to an intake manifold of an engine and having a venturi center;
   e. said venturi center having a roughened heated interior surface for converting a film of liquid fuel to a gas;
   f. a fuel line connected to said venturi center and supplying an evaporable liquid fuel to said roughened interior surface for evaporation of the liquid fuel into gas;
g. main throttle valves for admitting air to said venturi passageway;
h. an auxiliary throttle valve for admitting a mixture of gaseous fuel and air to said venturi passageway;
i. fixed vanes positioned in the path of air entering the venturi device through the main throttle valves and imparting turbulence to said air;
j. said turbulence of the air mixing the air with gas arising from the film of liquid fuel on the heated and roughened interior surface of the venturi center in passage of the air through the venturi passageway; and
k. a monitoring device connected across the venturi passageway;
l. said monitoring device sensing a pressure differential in the venturi device and regulating the amount of liquid fuel supplied to the venturi center in accordance with power requirements of the engine.

9. A system for supplying a mixture of gaseous fuel and air to an intake manifold of an internal combustion engine, which comprises:
a. first means for admitting a mixture of gaseous fuel and air to the engine during idle and low speed operation of the engine;
b. second means for increasing the mixture of gaseous fuel and air supplied to the engine for increased speed and power;
c. said second means including a venturi device having a center with a roughened and heated interior surface;
d. an adjustable needle valve for controlling the amount of liquid fuel supplied to said roughened and heated interior surface of the venturi center;
e. a monitoring device connected across said venturi device for setting the adjustable needle valve in accordance with a pressure differential across the venturi device; and
f. a main throttle valve for controlling the amount of air admitted to the venturi device.

10. A system for supplying a mixture of gaseous fuel and air to an intake manifold of an internal combustion engine, as defined in claim 9 which includes:
a. means for imparting turbulence to the air admitted to the venturi device through said main throttle valve.

* * * * *